United States Patent [19]

Fisch

[11] Patent Number: 4,584,615
[45] Date of Patent: Apr. 22, 1986

[54] BLACK AND WHITE DISC CONSTRUCTION TO RECORD COLOR IMAGES

[75] Inventor: Richard S. Fisch, St. Paul, Minn.

[73] Assignee: Minnesota Mining and Manufacturing Company, St. Paul, Minn.

[21] Appl. No.: 582,435

[22] Filed: Feb. 22, 1984

[51] Int. Cl.[4] .................. H04N 9/79; G03B 19/18; G03B 25/00
[52] U.S. Cl. .................. 358/332; 352/45; 352/102
[58] Field of Search .................. 358/332, 333, 345; 350/162.11, 162.12, 162.16; 352/45, 102; 354/121, 275

[56] References Cited

U.S. PATENT DOCUMENTS

| | | | |
|---|---|---|---|
| 3,586,434 | 6/1971 | Mueller | 355/2 |
| 3,609,010 | 9/1971 | Mueller | 350/162 |
| 4,194,822 | 3/1980 | Sethi | 354/121 |
| 4,268,145 | 5/1981 | Harvey et al. | 354/121 |
| 4,368,484 | 1/1983 | Stemme et al. | 358/332 |
| 4,386,151 | 5/1983 | Berger et al. | 430/228 |

FOREIGN PATENT DOCUMENTS 2027225 8/1978 United Kingdom.

*Primary Examiner*—Donald McElheny, Jr.
*Attorney, Agent, or Firm*—Donald M. Sell; James A. Smith; Lorraine R. Sherman

[57] ABSTRACT

A black and white disc construction employs a colored spatial frequency filter for encoding color images in black and white on a photographic film. Subsequently, the color images are reproduced by electronic means, e.g., a home color television set or video monitor.

10 Claims, 4 Drawing Figures

BLACK AND WHITE DISC CONSTRUCTION TO RECORD COLOR IMAGES

FIELD OF THE INVENTION

This invention relates to color photography utilizing a black and white film disc construction. In another aspect, a method of providing color image information to be reproduced by electronic means, e.g., a home color television set or video monitor, using a black and white film disc construction information source, is described.

BACKGROUND ART

The introduction of photographic cartridge assemblies such as those used for super 8 motion picture film, single 8, and motion picture film and film disc cartridges, the latter being disclosed in GB No. 2,027,225A, have provided unprecedented ease of camera operation. These advances have enabled the least photographically knowledgeable to reap the benefits of modern photographic technology.

Almost all of the amateur photographs taken utilize color film. Very few black and white snapshots are now recorded. Today's commercial color films (for print and transparency use) rely on the technology of multiple coatings of individual layers of photosensitive color-forming silver halide films. Such traditional color films are composed of at least 5 superimposed different layers. Some constructions contain as many as 18 to 20 layers. The complex manufacturing equipment as well as the unique chemical constituents of these layers can be quite costly. The various combinations of manufacturing conditions and raw material differences can produce great product variability. Quality control and closely monitored manufacturing operations add to the product costs. Such color films require chemical sophistication and narrow tolerances in order to produce acceptable color images.

Color photographic systems which do not require multilayer individual color-forming layers have been used in the past. Some of these require the use of dedicated cameras specially equipped with built in devices to separate and record color images on black and white film. Some of these built-in's include color prisms or mirrors with colored filters. Other techniques require using small individual color elements, ruled onto glass as in a "Finlay" screen in a regular ruled format, or on glass wherein an irregular format such as starch grains or blood cells are dyed and used as miniature filters. Such techniques rely on a reusable glass-containing filter permanently mounted in a camera and a single exposure black and white film mated to it to record the color image. A complicated processing sequence of development, developer arrest, silver oxidation, redevelopment, fixation and intermediate water washes are required before the film is ready to be viewed in black and white. Color rendition can only be accomplished by the re-registration of the black and white recording to the camera color filter screen or replica of the camera color filter and subsequently viewing the composite through a very strong light source. The viewing source has to be intense since the light has to pass through the dense silver image as well as the narrow band dark color filter rulings of the screen.

Techniques have also been employed to photochemically print a regular color ruling on the base side of a photographic light-sensitive black and white film such as that known as "Dufaycolor". Such a product involves the step of image formation or photography to be performed through the thick photographic film base (through the printed ruling and the film base) to the light-sensitive silver halide layer on the opposite side. Although this technique permits the use of a flexible film base and non-dedicated cameras, it still requires the use of special developers to produce the positive silver image. The technique presents the same difficulty its predecessor has in that the film requires an intense light source for viewing because the viewed light passes through the dense silver image as well as the colored filters on the other side of the base. Because the filter layer is an integral part of the flexible support, in rolling or packaging the film for use the colored printed layer comes into contact with the light-sensitive layer and can cause a chemical interference with it.

A modern version of this flexible film ruled color screen black and white film is disclosed in U.S. Pat. No. 4,386,151. It obviates the disadvantages of multi-step wet processing by use of the diffusion transfer technique. The ease of processing however is at the expense of reduced sharpness in the final image since a transferred black and white image does not match the sharpness of an original black and white image. No advantages are obtained in the final viewing of the images since one must again view the image through the silver layer and colored filter.

The use of spatial frequency recording and separation of color images onto black and white films has been described in U.S. Pat. Nos. 3,609,010 and 3,586,434. In these patents a conventional camera utilizing a special retrofitted filter with a colored spatial pattern is used to record color images onto conventional black and white film. Such a technique provides black and white images which are recorded in different spatial configurations. In those cases different azimuth positions encode the color information. The technique does not require the viewing of the resultant image through the same colored spatial pattern in order to be seen. Optical reconstruction is necessary for color viewing.

Within the last few years a photographic cartridge assembly commonly referred to as "disc film" or "disc cartridge" assembly has become commercially available and is described, for example, in U.S. Pat. Nos. 4,194,822 and 4,268,145 and GB No. 2,027,225A. The photographic cartridge assembly includes (1) an opaque casing with an exposure window in its front wall and (2) a film unit (or disc) which can contain black and white or multi-layered colored film rotatably mounted in the casing such that successive film portions can be aligned with the exposure window.

SUMMARY OF THE INVENTION

Briefly, the present invention provides a photographic disc construction comprising an opaque casing with an exposure window in one wall for rotatably housing (1) a disc of black and white photographic film movable about a fixed axis such that different film portions are moved successively into alignment with the exposure window, and (2) a separator layer (encoding layer) adjacent the emulsion side of said photographic film, the improvement comprising:

means in combination with said film for providing an encoded color image in black and white on said film when said film is image-wise exposed to light. Preferably, the separator layer of the disc cartridge assembly comprises in whole or in part a colored spatial frequency filter capable of encoding color images in black and white on the film when the film is image-wise exposed to light.

The present invention gives color film capability to a black and white film disc. The resulting black and white film image can be more easily reconstituted using a color reconstruction plate and photodetectors into color by electronic means (e.g., video, TV, and liquid crystal panels) than conventional color dye images.

The present invention construction comprises a disposable opaque container for a film (light-sensitive film disc), a capping shutter for such as container, a non-light sensitive separator layer between the capping shutter and the light-sensitive film disc and a light-sensitive disc of photographic film. The separator layer consists in whole or in part of a colored spatial frequency filter for recording red, green, and blue areas of the spectrum on the light-sensitive film. The light-sensitive material is any conventional black and white film. Preferably, a high speed/fine grain black and white film such as Kodak TM Plux-X TM or Tri-X TM is used.

It has been found that the addition of a colored spatial frequency filter as described in U.S. Pat. No. 3,609,010, which is incorporated herein by reference, in a photographic cartridge assembly of the type used for film discs, the cartridge assembly having been described in GB No. 2,027,225 which is incorporated herein by reference, permits the use of black and white film instead of color film in these cartridges yet allows color images to be easily recorded. Such a filter (encoder) may be used in place of a separator layer which protects the emulsion on the photosensitive layer from abrasion, or alternatively it may be attached as part of the separator layer. For example, it may be inserted in the exposure window of the separator layer.

Such a photographic disc-construction allows any ordinary amateur photographer having a disc-containing camera to record his color photographs onto black and white film and obtain color images by means of a reconstitution step. Substitution of black and white film for color film having multiple color-forming coatings containing costly materials results in reduced cost of the film. Also, simplicity of film processing is provided wherein the processing steps involved in color development may be shortened. Furthermore, sharper color images result from this technique when compared with conventional color film. Developing solutions which are less prone to cause dermatitis to the user are utilized, and rapid access film processing is facilitated. Such a construction containing a special encoding filter and black and white film permits home processing with quality results as well as providing images of archival stability. This is especially important since all dyes used in conventional color photography are fugitive. Alternative older black and white films which provide color images as previously described, such as Dufaycolor TM and Polachrome TM with integral color screen images, are not archival since the dyes used for the color filters are fugitive. The present invention provides archival color encoded images on black and white film which can easily be duplicated, for example by diazo or other non silver media, to provide black and white images which can be reconstructed to form color images. Such techniques are not easily available using alternative processes.

It has also been found that black and white images (encoded with color information) as produced by the present invention can be incorporated into the optical train of a device containing a Fraunhoffer lens arrangement with an optional spatial reconstruction filter and the fully separated three color images imaged onto a receptor (photodetectors) for read-out onto a conventional color television monitor.

As used in this application:

"photographic disc construction", "container", or "cartridge assembly" means a film disc container loaded with film and other components;

"spatial frequency filter" means an assembly of at least two or more repetitious reproductions of a diferaction grating or patterns on a transparent support. These patterns may be of different frequencies or of the same frequency displaced by a change in azimuth position from each other or a combination of both. Such spatial filters and techniques as described by Yu in "Optical Information Processing", 314–318, John Wiley & Sons, New York (1983), are hereby incorporated by reference. In the case of spatial filters which consist of one set frequency, the change of azimuth position shall be at least from 25° to 120° from each other. In the case of 3-pattern filters they shall be at least between 30° and 120° from each other, preferably about 30° to 90°, and most preferably 45° to 60°. Each of the different filters in a multi-pattern configuration shall be able to transmit a different area of the spectrum. In the case of 3- or 4-pattern filters each shall be colored differently and capable of breaking up the electromagnetic spectrum into parts which act as color separation filters for color photography i.e., red, green, and blue or magenta, yellow, and cyan colors;

"film disc" means a circular or polygonal construction or modification thereof having a transparent base of from at least 51 micrometers (2 mil) to 254 micrometers (10 mil) in thickness, preferably 102 to 178 micrometers (4 to 7 mil) in thickness, most preferably 178 micrometers (7 mil) in thickness. It is able to meet the specifications of a light-tight cartridge assembly that can be put into a camera in daylight environment. This disc additionally contains on at least one surface one or more light-sensitive layers, preferably silver halide layers, and at least one filter layer, e.g., an antihalation layer underlying or between the light-sensitive layer(s) or on the opposite surface of the film base from the light-sensitive layer. Alternately, additional filter layer(s) may overlay one or more of the optional light-sensitive layers. Such a layer does not employ color-forming materials (i.e., color couplers) in its light-sensitive layers; and "encoded", "coded" or "encoding" means recording of the subject to be photographed as modified by the frequency filter onto the film and is represented by a definable and determinable physical distribution pattern of information on a film; individual areas and information units correspond to distinct color information; and "separator layer" or "encoder" means a layer, preferably a thermoplastic polymeric layer, which overlies the film disc in a cartridge assembly; it may consist, in whole or in part, of a transparent colored spatial frequency filter.

DETAILED DESCRIPTION

Figure 1:
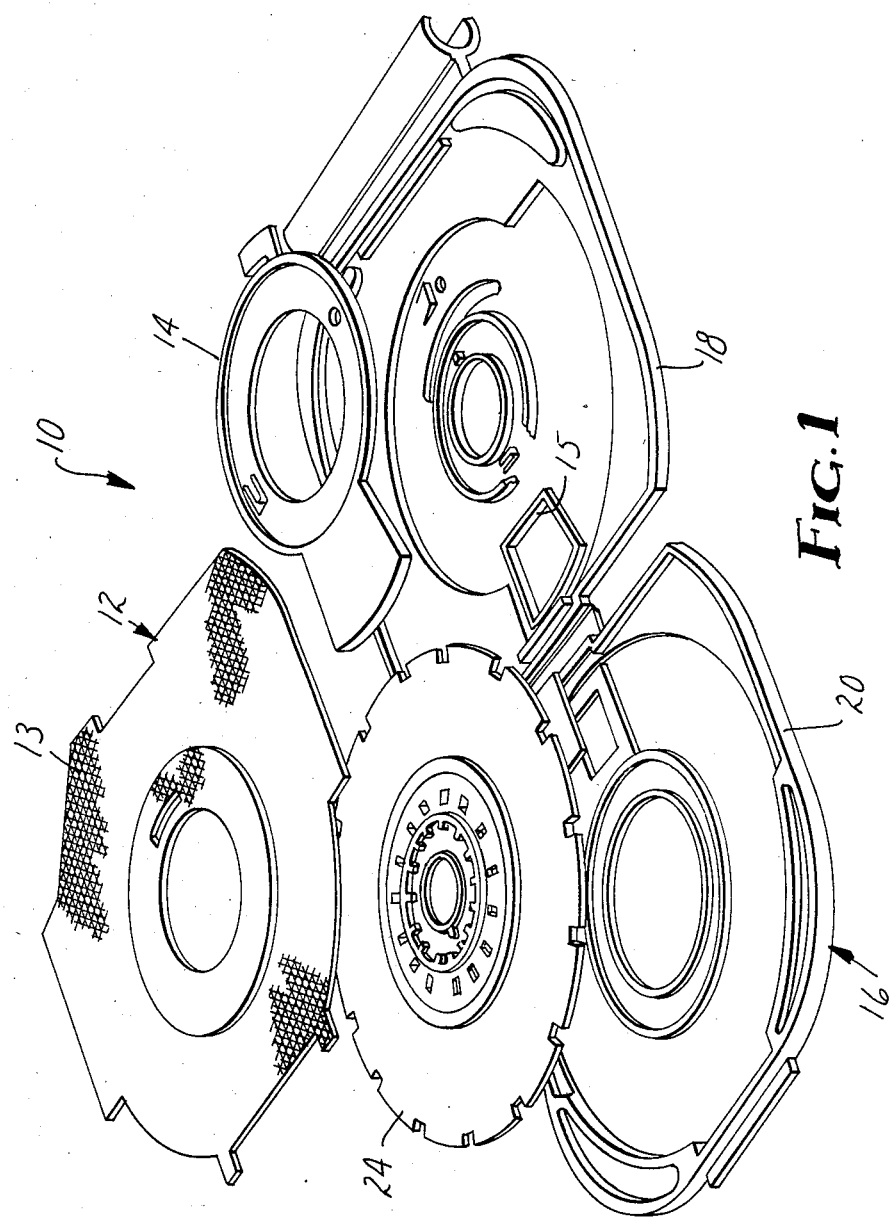
FIG. 1 is an exploded perspective view of an unassembled film disc construction in accordance with the present invention.

A cartridge assembly shown in FIG. 1 is described in detail in U.S. Pat. No. 4,194,822, which is incorporated herein by reference for its disclosure of the physical construction of a cartridge assembly, and includes a cartridge assembly 10 having film disc 24, a separator layer 12, a cover member 14, and a casing 16 with top and bottom parts 18 and 20, respectively. Separator layer 12 overlies film disc 24 and provides protection and lubrication to the film disc. Separator layer 12 can be made entirely or partially of spatial frequency filter material 13. If a portion only of separator layer 12 is made of spatial frequency filter material 13, the filter material 13 being at least as a large as exposure window 15 and can be attached, as by heat-lamination, to separator layer 12. Cartridge assembly 10 of the present invention includes the approximate 25.4 micrometer (1 mil) separator film thickness in the film to lens distance and therefore a conventional disc camera would be able to accomodate this special layer without causing the image to be "out of focus".

Figure 2:
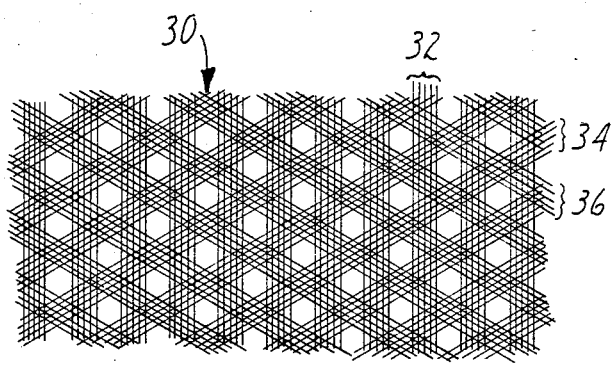
FIG. 2 illustrates a spatial frequency filter of the subtractive or negative type or the additive or positive type suitable for simultaneous storage of three spectral zones of a scene with unique periodic modulations in a black-and-white panchromatic storage medium.

FIG. 2 illustrates a "negative" spatial separation color filter 30 consisting of the superposition of three colored Ronchi rulings 32, 34, 36 having respective unique azimuthal characteristics, e.g., rotated in $\pi/3$ increments from one to another. Vertical bars 32 in FIG. 2 represent yellow bars, with transparent bars intervening; these comprise a yellow Ronchi ruling having periodicity P (x), which generally is represented mathematically by $$P_y(x)a_y$$

Similarly, a magenta ruling 34 is generally represented by $$P_m(x)a_m$$

and a cyan ruling 36 is generally represented by $$P_c(x)a_c.$$

The three rulings are superposed, so that they are multiplied each with the others, and the product of their respective modulations as a function of spatial coordinates (x) and wavelengths ($\lambda$) is:

$$\pi(x \cdot \lambda) = P_y(x)a_y \cdot P_m(x)a_m \cdot P_c(x)a_c$$

where:

$\pi(x \cdot \lambda)$ represents the product of the periodic yellow, magenta and cyan modulations as a function of spatial coordinates (x) and wavelength ($\lambda$).

Figure 3:
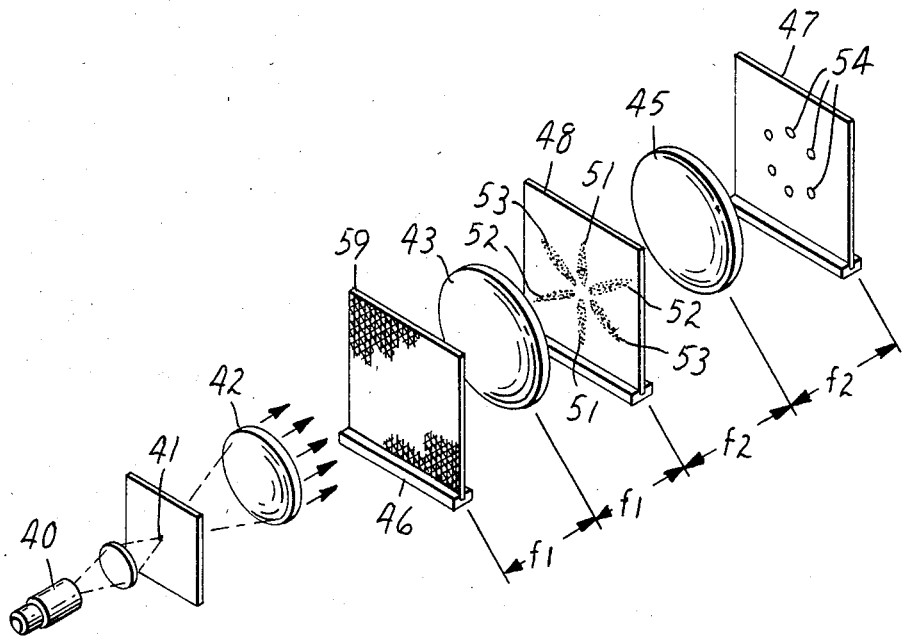
FIG. 3 illustrates a system for reconstructing color images by means of Fourier transform of the stored record and spatial and spectral filtering, along the general lines suggested by U.S. Pat. No. 2,050,417.

In effect, use of a spatial frequency filter provides for the black and white encoding of the three primary colors of an image at such minute sizes that each part of the image is recorded three times, in each of the three colors, and all adjacent to each other on the one piece of black and white film. In retrieving the color image from the single black and white photo the transparency is illuminated such that the Fourier spectrum is formed at the point where the color reconstruction plate is located. The individual color information is separated in this plate (due to the orientation of the colors), and the black and white signals from the color representation are imaged onto the respective photo cells or detectors. These red, green, and blue signals are electronically recombined, amplified, and fed, using conventional color television techniques, to a color video system to form a full color image on a color TV screen, as shown in FIG. 3.

The spatial frequency filter is a substantially two-dimensional light modulation filter for use in preparing from colored light representing a scene a black and white image transparency suitable for producing by Fourier transform and spatial and spectral filtering techniques a projected image of the scene in prescribed colors. These colors may be natural or artificial, from "n" light components repesenting respective spectral zones of the colored light where "n" is an integer greater than one, the filter having a plurality of "n" periodic functions each extending throughout the area of the filter and having a unique azimuthal characteristic in the area of the filter for passing light representative of a unique wavelength band corresponding to a selected one of the spectral zones.

The dye densities of the color filter making up the spatial frequency filter are in the range of 1.0 to 2.5.

When 40 line pairs per millimeter (lp/mm) grating are used, the resolution of the final imagery obtained is 28 lp/mm. This is an average figure obtained with standard high contrast bar targets. The state of the art has progressed to the point that separator layers with gratings with a frequency of 80 lp/mm are available (providing color imagery with a resolution of about 56 lp/mm), and, it is feasible to prepare gratings at resolutions of 100 lp/mm and greater. These higher resolution gratings will provide color imagery which is higher in resolution than standard reversal color film (which resolves about 50 to 60 lp/mm).

It is anticipated and within the scope of the present invention that the grating (colored spacial frequency filter) can be planographically positioned, e.g. printed or transferred, onto the film itself, the process being called film striping. Spatial frequency filters can also be prepared by successive color transfer or successive vacuum deposition. The filter base material is preerably transparent and may be made of optically clear film base such as polyethylene terephthalate, cellulose acetate, cellulose acetate butyrate, and polypropylene as non limiting examples having a thickness in the range of 13 micrometers (0.5 mil) to 64 micrometers (2.5 mils), preferably about 51 micrometers (2 mils).

FIG. 3 illustrates diagrammatically an optical system for reconstructing and viewing or recording colored images that are stored in black and white as described above. It is a fairly conventional partially coherent optical system comprising a light source 40, pin hole aperture 41, light collector lens 42, converging (or transform) lenses 43 and 45 separated by the sum of their focal lengths $f_1$ and $f_2$, frame means 46 for supporting a color-coded black and white transparency 59 and support means 47 for supporting a series of photodetectors 54 whose signals from the black and white film will be used to derive a full color television representation of transparency 59. A color reconstruction plate 48 is located in the back focal plane of the first transform lens 43 and the front focal plane of the second transform lens 45.

For purposes of this invention, light source 40 preferably is an intense polychromatic light source. For example, a xenon mercury arc lamp can be used.

Color reconstruction plate 48 has arrayed about the center in diametrically-opposed pairs six equal apertures. A pair of apertures 51 (non filter-containing) are located in the path of light and are related to the blue exposure; a pair of apertures 52 are located in the path of light and are related to the red exposure; and a pair of apertures 53 are located in the path of light and are related to the green exposure. A reconstruction (not shown), in black and white of each of the full color images making up the original color scene photographed appears in the plane of support means 47 where they were electronically accessed by vidicon, CCD arrays, and/or other photodectectors 54 and utilized to produce signals that can be reconstructed as a full color image, for example, on a color television system.

Where a conventional dye image color transparency or negative film has to be utilized to produce a color television image, a more exotic optical train is needed. Such a train employs mirrors and prisms as well as color filtration to separate the combined dye picture into its single color components for photodetector analysis. Photodetectors are not equally energy-sensitive and therefore are operated at different electronic conditions in order to equally record color film from a color transparency containing information from the total color spectrum. To compensate for this difficulty electronic means are used (i.e., increasing the overall phototube sensitivity) for trying to obtain different phototubes that closely match the color dye areas. Such matches as obtained in this manner are at best difficult and only partially effective. Such changes in the photocell overall sensitivity lead to instability or only short term reproducibility of the photocell in question and therefore erratic color balance in the resultant television representation. Therefore, besides utilizing a more economic analysis system, the technique as described (only black and white film and no color filtration) has the potential of producing truer color representation.

Polychromatic light of the type used to routinely project or illuminate conventional color transparencies for analysis or photo detection contains a considerable fraction of infrared radiation (hereinafter "IR"). Such infrared radiation as is incident onto conventional color film is transmitted freely through the color dyes used and therefore impinges onto the photodetectors. Such detectors as employed conventionally are intrinsically IR sensitive. The non image IR incident on the photodetector distorts the color signal also incident on the detector and therefore must be removed by optical filtration. Such IR filters as presently available are ineffective and inefficient for this job. Since only black and white silver images are used to encode the color information in this invention and since silver is a very good IR filter such signals as received by the photodetectors do not suffer the IR degradation previously inherent in the use of conventional dye images and therefore increase color separation fidelity.

The cartridge assembly of the present invention containing black and white film can be used in conventional off-the-shelf disc cameras to record color images. Such color images can be reproduced or optically reconstructed as a signal onto photoconductors and the signal can then be transmitted electronically to an electronic display media, for example to be viewed by conventional means (a slide projector) or, preferably, by use of electronic viewing (CRT, i.e., TV monitor).

Objects and advantages of this invention are further illustrated by the following examples, but the particular materials and amounts thereof recited in these examples, as well as other conditions and details, should not be construed to unduly limit this invention.

In the following examples:

(1) the method of producing the encoding filter are not meant to be exclusive; techniques of vapor coating dyes or interference filter deposition and/or photomechanical printing as well as resist imaging and others are also applicable;

(2) the line frequencies of the Ronchi Ruling in the Examples are only meant to be illustrative. Specific line frequency is dependent on the photoemulsion used and the system resolution desired. Different spatial frequencies for the different colors to be encoded are practical; combinations of a change in azimuth position as well as frequency of the ruling are also useful;

(3) encoding filter position: the use of a separator or a portion of the separator in these examples only serves to illustrate the invention. The encoder filter has to be placed in the cartridge in contact or in close proximity with the black and white film used. It could be imprinted on the film and washed away during processing;

(4) the particular black and white film used and its processing are only illustrative. Any continuous tone black and white film can be used providing it has adequate photographic speed and spectral response to be used in the illustrated photographic disc construction and produce adequate black and white images. The processing solution is also meant to be illustrative. The solutions and means of application can be of the conventional type or stabilization, saturated web, and of the monobath type, to name a few. Objects and advantages of this invention are further illustrated by the following examples, but the particular materials and amounts thereof receited in these examples, as well as other conditions and details, should not be construed to unduly limit this invention.

EXAMPLE 1 a. Preparation of a negative color encoding filter

Figure 4:
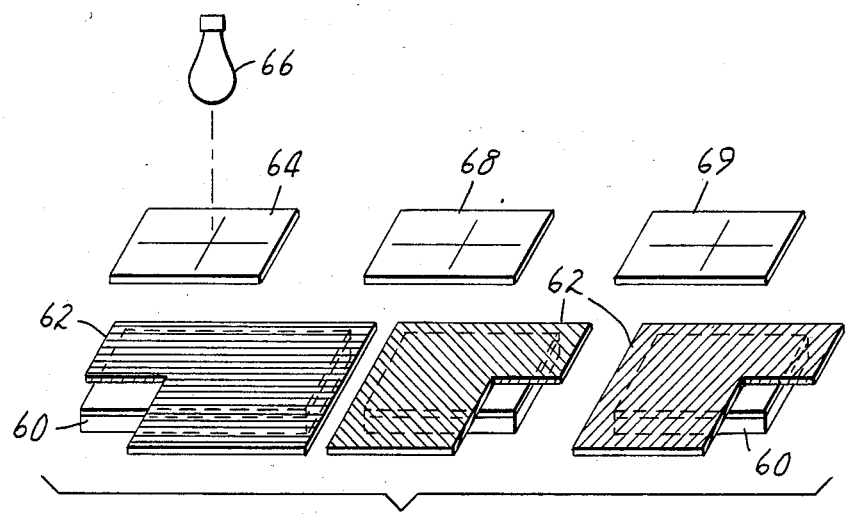
FIG. 4 illustrates the steps of a process for sequentially storing spectral zonal information for three separate zones with unique periodic intensity modulation in a single black-and-white storage medium.

As shown in FIG. 4 a multilayer color transparency film 60 designated as Color Slide Film ASA 64 was vacuum contacted to Ronchi ruling 62 having 16 lines/cm (40 lines/in.) and exposed through blue filter 64 Wratten TM No. 47B (Eastman Kodak, Rochester, NY) using a Honeywell TM Strobonar TM No. 700 (Honeywell, Minneapolis, MN) xenon flash. The lamp (Xenon flash) 66-to-film 60 distance was adjusted to provide a yellow dye density of about 1.0 after exposure (exposure 1) and development.

After the first exposure (with no development) the vacuum system was opened and Ronchi ruling 62 turned so that it was on an angle of 60° relative to its position during exposure 1. The vacuum was then reconnected and film 60 was exposed a second time, this time through green filter 68 Wratten TM no. 58 using the Honeywell Strobonar; the lamp 66-to-film 60 distance had been adjusted so that a resultant magenta dye density of over 1.0 was available after exposure and development.

After the second exposure (with no development) the vacuum was again broken and Ronchi ruling 62 was rotated 60° relative to the previous exposure. Again the vacuum was reapplied, and the film 60 was exposed through red filter 69 Wratten TM no. 29. The Honeywell 700 xenon flash 66 was again employed as the light source. Its position had been readjusted to provide a cyan dye density over about 1.0 after exposure and processing.

After all three exposures the film was developed using the Eastman Kodak TM C-41 process. The development sequence was not the normal process for transparency film of the Ektachrome TM type but rather the process for the color print film called Kodacolor TM.

A negative color spatial frequency filter of a set of frequency lines of yellow, magenta and cyan stripes as represented in FIG. 2 at 60° angles to each other resulted from this procedure. The filter was cut into the format of the separation layer as shown in FIG. 1 and described for disc film cartridge in GB No. 2,027,225. The filter was placed into the cartridge. The disc film cartridge was then thermally sealed using conventional techniques and placed into a disc camera sold commercially under the name Kodak TM Disc Camera Model 4000. Photographs were taken of normal colorful scenes and the cartridge removed. In the dark the cartridge was opened and the black and white film developed using developer D-76 which is described in the "Photo Lab Index," Morgan and Morgan Publishers, Hastings-or-Hudson, NY, 3-162 (1059), to an equivalent black and white ISO film speed rating of 400 ASA.

The resultant black and white image was viewed without projection from a distance and appeared as normal. Closer inspection by a hand lens of at least 10× indicated these images were made up of a series of fine lines angled from each other; closer scrutiny indicated that the original subject materials that would appear green in the original scene were angled at 60° from those that were blue and those that appeared red were in turn angled at 60° from those that were green.

The resultant encoded black and white film disc was placed in a modified Fraunhoffer Optical train as depicted in FIG. 3 above, (The image projected onto photo cells as mounted on suport means 47 (see FIG. 3) were of sufficient clarity and color separator to be used to reconstruct a color view of the original scene on, for example, a TV monitor.

b. Preparation of a positive color encoding filter

A positive color spatial frequency filter of a set of frequency lines of blue, green, and red stripes at 60° angles to each other can be prepared using the procedure described in a. above, except that the encoded film can be developed using the Eastman Kodak TM E-6 process for Ektachrome film.

EXAMPLE 2

A black and white disc color film package was prepared as in EXAMPLE 1 except that the encoding color filter 13 (see FIG. 1) comprised a portion of separator layer 12 and had the configuration of exposure window 15 and did not constitute the whole separator. The filter 13 was adhered in position in separator layer 12. The results of this EXAMPLE were identical to that of EXAMPLE 1.

EXAMPLE 3

The imaged encoded developed black and white film disc can be contact printed onto Scott TM Diazo 216 using a Scott TM Microprinter A 716 (Scott Micrograhics Co., Holyoke, MA) for 4 seconds exposure and developer in ammonia fumes for 30 seconds. This results in a duplicate of the encoded image. When the diazo duplicate is placed into the optical train described as FIG. 3 above an electronically accessed (as by using a color TV monitor) a full color reproduction can be provided equal to the color reproduction of the original encoded black and white original film itself.

Various modifications and alterations of this invention will become apparent to those skilled in the art without departing from the scope and spirit of this invention, and it should be understood that this invention is not to be unduly limited to the illustrative embodiments set forth herein.

I claim:

1. A photographic disc construction having an opaque casing with an exposure window in one wall for rotatably housing
   (a) a disc of black and white photographic film movable about a fixed axis such that different film portions are moved successively into alignment with the exposure window, and
   (b) a separator layer adjacent the emulsion side of said photographic film, the improvement comprising:
   said separator layer being a thin, continuous, thermoplastic, polymeric layer comprising in whole or in part a transparent colored spatial frequency filter which in combination with said film provides an encoded color image in black and white on said film when said film is image-wise exposed to light.

2. The photographic disc construction according to claim 1 wherein said means for encoding color images in black and white is
   said separator layer comprising in whole or in part a colored spatial frequency filter.

3. The photographic disc construction according to claim 1 wherein said means for encoding color images in black and white comprises:
   a colored spatial frequency filter planographically positioned on said photographic film.

4. A method of providing an encoded color image on black and white photographic disc film said method comprising:
   (a) providing a photographic disc construction having an opaque casing with an exposure window in one wall for rotatably housing
      (1) a disc of black and white photographic film movable about a fixed axis such that different film portions are moved successively into alignment with the exposure window, and
      (2) a thin, continuous, thermoplastic, polymeric separator layer adjacent the emulsion side of said photographic film,
      said separator layer comprising in whole or in part a transparent colored spatial frequency filter for encoding color images in black and white on said film when said film is image-wise exposed to light, and
   (b) encoding said color image in black and white on said film by image-wise exposing said film to light.

5. The method according to claim 4 further comprising the steps of:
   (c) optically reconstructing said encoded images as a signal onto photodetectors, and
   (d) transmitting said signal electronically to an electronic display media.

6. The method according to claim 5 for providing an electronic image.

7. The method according to claim 4 further comprising the step of:

duplicating said resulting encoded color image to provide successive color reproductions of said image for distribution.

8. The method according to claim 4 wherein said means for encoding color images in black and white is said separator layer comprising in whole or in part a colored spatial frequency filter.

9. The method according to claim 4 wherein said means for encoding color images in black and white comprises a colored spatial frequency filter planographically positioned on said photographic film.

10. The method according to claim 4 for providing a photographic film encoded with color images.

* * * * *